(12) United States Patent
Le Bars et al.

(10) Patent No.: US 8,410,703 B2
(45) Date of Patent: Apr. 2, 2013

(54) CONTROL DEVICE FOR ELECTRICITY SUPPLY TO A HEADLAMP

(75) Inventors: Jean-François Le Bars, Elchingen (DE); Boris Wiegand, Muensterlingen (CH); Eric Blusseau, Angers (FR)

(73) Assignee: Valeo Vision, Bobigny (FR)

( * ) Notice: Subject to any disclaimer, the term of this patent is extended or adjusted under 35 U.S.C. 154(b) by 95 days.

(21) Appl. No.: 12/868,935

(22) Filed: Aug. 26, 2010

(65) Prior Publication Data

US 2011/0050102 A1 Mar. 3, 2011

(30) Foreign Application Priority Data

Aug. 26, 2009 (FR) .................................... 09 55818
Mar. 25, 2010 (FR) .................................... 10 52191

(51) Int. Cl.
*B60Q 1/02* (2006.01)
*B60Q 1/00* (2006.01)
(52) U.S. Cl. ........................... 315/82; 362/465; 348/148
(58) Field of Classification Search .................... 315/82; 701/70; 362/464–466, 503; 382/104
See application file for complete search history.

(56) References Cited

U.S. PATENT DOCUMENTS

| | | | | |
|---|---|---|---|---|
| 6,609,817 B2 * | 8/2003 | Niwa et al. | ..................... | 362/466 |
| 6,906,467 B2 * | 6/2005 | Stam et al. | ..................... | 315/82 |
| 6,947,576 B2 * | 9/2005 | Stam et al. | ..................... | 382/104 |
| 7,762,699 B2 | 7/2010 | Reiners et al. | | |
| 2003/0123705 A1 * | 7/2003 | Stam et al. | ..................... | 382/104 |
| 2004/0114379 A1 * | 6/2004 | Miller et al. | ................... | 362/464 |
| 2005/0169005 A1 | 8/2005 | Flandre et al. | | |
| 2007/0268159 A1 * | 11/2007 | Futamura | ...................... | 340/933 |
| 2008/0043099 A1 * | 2/2008 | Stein et al. | ..................... | 348/118 |
| 2009/0080210 A1 | 3/2009 | Reiners et al. | | |
| 2009/0167188 A1 | 7/2009 | Mueller et al. | | |
| 2010/0265330 A1 * | 10/2010 | Li et al. | ......................... | 348/148 |
| 2010/0312446 A1 * | 12/2010 | Schofield et al. | ............... | 701/70 |

FOREIGN PATENT DOCUMENTS

| | | |
|---|---|---|
| DE | 102005014754 A1 | 10/2006 |
| DE | 102005035989 A1 | 2/2007 |
| DE | 102006022022 A1 | 9/2007 |
| DE | 102006021694 A1 | 11/2007 |
| EP | 1129900 A1 | 9/2001 |
| EP | 1195295 A1 | 4/2002 |
| EP | 1566990 A1 | 8/2005 |
| EP | 1800948 A1 | 6/2007 |
| EP | 2067660 A2 | 6/2009 |

* cited by examiner

*Primary Examiner* — Shawki Ismail
*Assistant Examiner* — Dylan White
(74) *Attorney, Agent, or Firm* — Jacox, Meckstroth & Jenkins (57) ABSTRACT

A process, system and procedure of controls of the supply of a vehicle headlamp suitable to supply lighting in high beam function and/or low beam function, comprising the following stages for at least one of the low beam function and high beam functions:

determining at least one driving parameter pertinent to the lighting of the vehicle, defining several lighting modes characterized by the value of this at least one parameter, attributing a supply mode of the headlamp to each lighting mode, and storing in memory the supply mode associated with each of the lighting modes.

19 Claims, 5 Drawing Sheets

| | Town mode, night, low speed | Town mode, night, normal speed | Town mode, twilight, normal speed | Light mode, countryside, twilight, reduced speed | Light mode, countryside, night, reduced speed | Light mode, countryside, night, normal speed | Light mode, countryside, twilight, normal speed |
|---|---|---|---|---|---|---|---|
| Ambient lighting sensor | < threshold 1 (night) | < threshold 1 (night) | < threshold 2 (twilight) | < threshold 2 (twilight) | < threshold 1 (night) | < threshold 1 (night) | < threshold 2 (twilight) |
| Sensor 100 Hz ambient lighting | yes | yes | no | no | no | no | no |
| Speed info | <30km/hr | 30<V<50km/hr | V<50km/hr | 50<V<70km/hr | 50<V<70km/hr | 70<V<90km/hr | 70<V<90km/hr |
| Time measurement | >5s | >5s | >5s | >5s | >5s | >5s | >5s |
| Acceleration info | N.A. | N.A. | N.A. | N.A. | N.A. | N.A. | N.A. |
| Navigation info | yes/no | yes/no | yes/no | yes/no | yes/no | yes/no | yes/no |
| Steering wheel speed | No | No | No | No | No | No | No |
| Voltage applied to the lamp | 10.5 | 10.5 | 11.2 | 11.2 | 12.2 | 12.8 | 12.2 |

| | Road mode, twilight, normal speed | Road mode, twilight, normal speed | Road mode, twilight, normal speed | Headlight flashing | Fast road light mode | Motorway light mode | DBL mode normal spped |
|---|---|---|---|---|---|---|---|
| Ambient lighting sensor | < threshold 2 (twilight) | < threshold 1 (night) | < threshold 1 (night) | N.A. | < threshold 1 (night) | < threshold 1 (night) | < threshold 1 (night) |
| Sensor 100 Hz ambient lighting | no | no | no | | no | no | no |
| Speed info | 70<V<90km/hr | 50<V<70km/hr | V<70km/hr | | V<100km/hr | V<130km/hr | V<70km/hr |
| Time measurement | >5s | >5s | >5s | | >5s | >5s | >5s |
| Acceleration info | N.A. | N.A. | N.A. | | N.A. | N.A. | N.A. |
| Navigation info | yes/no | yes/no | yes/no | | yes/no | yes/no | yes/no |
| Steering wheel speed | No | No | No | No | No | No | No |
| Voltage applied to the lamp | 12.2 | 12.8 | 13.2 | 13.2 | 12.8 | 13.2 | 13.2 |

CONTROL DEVICE FOR ELECTRICITY SUPPLY TO A HEADLAMP

CROSS-REFERENCE TO RELATED APPLICATIONS

This application claims priority to French Application No. 0955818 filed Aug. 26, 2009, and to French Application No. 1052191 filed Mar. 25, 2010, which applications are incorporated herein by reference and made a part hereof.

BACKGROUND OF THE INVENTION

1. Field of the Invention

The invention concerns a device to control an electrical supply of a vehicle headlamp. The invention also concerns a motor vehicle headlamp as well as a control procedure for the supply of such a headlamp.

2. Description of the Related Art

The invention is applied in the automobile field and, in particular, in the field of lighting for motor vehicles for the electricity supply to incandescent bulbs or electro-luminescent diodes in vehicle headlamps.

In the field of automobile lighting, there are different types of lighting function, which essentially include the following:
- sidelights of low intensity and range. This function is mainly intended to signal the presence of the vehicle in terms of average brightness and visibility;
- low beam, of stronger intensity with a range on the road generally approaching 70 meters. This function is essentially used at night. It features a luminous division presenting, in at least one zone, a strong luminous gradient so as not to dazzle drivers in front or oncoming;
- high beam, with a long range typically approaching 200 meters. This function is used to light up the road from afar and allow the driver to apprehend the trajectory of the vehicle; and
- fog lamps.

At present, there are light projection devices, or headlamps, which provide low beam and high beam functions. These headlamps are generally referred to as dual function headlamps.

Such a dual function headlamp comprises a light source emitting a flow of light which is identical regardless of the mode of functioning (high or low beam). It generally comprises a movable cover suitable to ensure a cut-off of the beam of light. This cover is, for example, a metal shutter which may be in a first position or a second position. In the first position, the cover does not conceal the beam of light produced by the light source, or bulb, of the headlamp. In the second position, the cover partially conceals the beam of light produced by the headlamp bulb. In the second position, it is said that the cover specifically cuts off the beam of light, and this specific cut-off corresponds to the cut-off of the beam of light necessary to obtain the low beam function. Thus, lighting in low beam or high beam mode is differentiated by the presence or otherwise of the cut-off.

In current dual function headlamps, the light source may be a halogen bulb. This halogen bulb is generally supplied by a fixed voltage, which is generally the rated voltage of the bulb specified by bulb manufacturers for each type of bulb. This rated voltage is quite often the feed voltage for which the functioning of the bulb fulfils statutory requirements.

The bulb manufacturers, in addition to indicating a rated voltage, indicate an average life duration for the bulbs. Typically, the life duration of a bulb of type H7 is about 900 hours at 13.2V.

However, it transpires in practice that the average life duration of the bulbs is often significantly below that indicated by the manufacturers due to the voltage of the vehicle's electrics, which often have a rated voltage higher than that of the bulb. At the end of its life duration, a new bulb must be purchased and re-installed in the headlamp. This operation is increasingly complicated for the user to carry out, and may entail the immobilization of the vehicle and an extra cost.

There is therefore a need to increase the real life duration of the bulbs while conserving satisfactory lighting performances.

Furthermore, there is a need to reduce the energy consumed by a headlamp for lighting the vehicle.

SUMMARY OF THE INVENTION

The invention aims to provide a solution to at least one of the needs expressed above.

To this effect, the present invention provides a control procedure for the electricity supply of a vehicle headlamp able to provide lighting in high and/or low beam function, characterized in that it comprises the following stages for either the low or high beam functions, at least:
- determining at least one driving parameter pertinent to the lighting of the vehicle;
- defining several lighting modes characterized by the value of this at least one parameter;
- attributing to each lighting mode a supply mode of the headlamp; and
- storing in memory the supply mode associated with each of the lighting modes.

Thus, one adapts the supply mode of the headlamp in accordance with lighting modes and hence driving situations. Consequently, one modulates the energy consumption of the headlamp, which makes it possible to prolong the life duration of the light sources and/or reduce the $CO_2$ emission of the headlamp in accordance with driving situations. The control procedure may include an adaptation stage of the supply mode of the headlamp in accordance with these lighting modes, and hence an adaptation of the lighting in accordance with these lighting modes.

According to a particular mode of realization, each supply mode of the headlamp corresponds to a given voltage applied to the headlamp and/or corresponds to a given intensity applied to the headlamp. Thus, according to the identified driving mode, one adapts the lighting by modulating the voltage and/or intensity applied to the headlamp.

It transpires that the voltage at the terminals of the bulb directly influences its life duration. To be precise, the higher the voltage, the shorter the life duration of the bulb. For example, with voltage of 13.2 Volts, a bulb H9 has a life duration of about 4.4 times below that corresponding to a voltage of 11.78 Volts, which is, in this case, in the order of 1100 hours.

Moreover, the performance of a bulb mainly features its flow and brightness. These performances, flow and brightness levels are according to the voltage at the terminals of the bulb. Thus, the higher the voltage at the terminals of the bulb, the higher the flow and brightness. By way of example, considering brightness: the brightness of a bulb of H9 standard type is in the order of 3400 $cd/cm^2$ for a voltage at the terminals of the bulb of 13.2 Volts, and 3150 $cd/cm^2$ for a voltage of 12.8 Volts.

In other words, improved brightness adversely affects the life duration of the bulb.

Within the framework of the development of the present invention, it transpired that in existing headlamps, due to the fact of the presence of the alternator at the battery terminals, the voltage generally rises considerably as the engine turns. This raising of voltage typically manifests as the passage from 13.2 Volts to 14 Volts or more. This raising of voltage, in addition to entailing excessive consumption, tends to considerably reduce the life duration of the bulb.

Furthermore, quite often, this excessive consumption is not accompanied by significantly improved driving comfort or safety, since satisfactory lighting is already obtained at a lower voltage.

The invention is intended to resolve the critical problem of the excessive electricity consumption of halogen bulbs for automobile lighting by prolonging the life duration of the bulbs, while providing adequate headlamp performances in normal travelling conditions and high performances in particular conditions such as, for example, motorway travel, lighting in "turning light" mode or braking.

The invention plans to adapt the voltage delivered to the bulb in accordance with the driving mode while the headlamp operates on low or high beam mode. One thus has several voltages for the same lighting function. The voltage delivered to the bulb is thus chosen so as to generate satisfactory lighting while limiting superfluous lighting which entails excessive consumption, by supplying it with a voltage below the maximum recommended voltage and, in the largest possible number of cases, below the voltage of the vehicle's electrics. This voltage takes into account the parameters inside and outside the vehicle. By way of example, if ambient light is present, one applies a voltage below the maximum voltage to generate adequate lighting. Bulb consumption is then reduced and its life duration is increased. Moreover, the quantity of $CO_2$ emitted is likewise reduced.

According to another mode particular of realization, the headlamp comprises several light sources and each supply mode of the headlamp defines the activation or deactivation of at least one light source regardless of the other light sources.

Thus, according to the driving situation, one determines a mode of lighting and adapts the lighting by modulating the division of the light sources activated and the light sources deactivated. Due to this fact, one modulates the quantity of energy consumed by the headlamp and consequently the $CO_2$ emission induced by the lighting.

In one particular variant of realization, each supply mode of the headlamp defines the activation or deactivation of each of the sources regardless of the activation and deactivation of the other light sources. One may thus very precisely adapt headlamp consumption. In accordance with the division and number of sources activated and not activated, one may likewise define a large number of lighting features generated by the headlamp.

According to one particularly advantageous variant, the lighting supplied by the headlamp generates a lighting pattern and a light intensity, and the supply modes are defined so that the pattern is significantly identical for at least several supply modes, and so that for these several supply modes, the light intensity varies from one supply mode to the other.

It is therefore arranged in one supply mode, to divide the deactivated and activated sources so as not to show any variation of pattern. The deactivation of certain light sources therefore does not give rise to dark or poorly lit zones. The driver's perception of the generated pattern consequently remains constant whatever the driving mode. On the other hand, beam intensity varies from one driving mode to the other. One may thus significantly reduce the power consumed by the headlamp without severely disturbing the driver. Advantageously, the perception of the pattern likewise remains constant for the drivers of other vehicles or pedestrians.

According to one particular variant of realization, a procedure is arranged in which the headlamp comprises several light sources in which each supply mode of the headlamp defines the voltage or intensity applied to each of the sources respectively.

So as an option, the invention further comprises at least any one of the following characteristics:

the light sources of the headlamp include incandescent bulbs, electro-luminescent diodes or modules comprising a plurality of electro-luminescent diodes or a plurality of bulbs;

this, at least one, parameter, comprises a parameter within the vehicle chosen from among the following parameters: vehicle speed, navigation data, running speed of the vehicle engine, rotation speed of a steering wheel of the vehicle, activation of the windscreen wiper and fog lamps, an acceleration value, speed or angle of activation of a brake pedal or accelerator, the engaging of a control by the driver, for example the choice of "Economy" mode;

this, at least one, parameter, comprises a parameter outside the vehicle, that is to say a parameter which is indicative of the state outside the vehicle, this parameter being chosen from among the following parameters: ambient lighting, brightness of street lighting, brightness of daylight, degrees of pollution (in relation to one or more molecules);

this, at least one, parameter, comprises a parameter outside the vehicle chosen from among the following parameters: traffic density, number of vehicles within a certain perimeter, distance in relation to a followed vehicle, relative speed and/or acceleration in relation to a followed vehicle, following vehicle or passed vehicle, color of a marking line on the ground, meaning of a signal panel, presence of an obstacle, arrival at a crossroads or roundabout, presence of an urban environment, presence of street lighting, obstacle detection, presence of a red light or even the presence of fog, rain, snow or smoke, obstacle detection; and this, at least one, parameter, comprises a parameter which is indicative of traffic density, which is determined by navigation data reflecting traffic density. For example, one arranges for a vehicle equipped with a navigation system to receive information indicating that the vehicle is located in a traffic jam. The device identifies when the vehicle is in traffic jam driving mode and then orders a decrease of power applied to the headlamp. Alternatively, traffic density is determined by navigation data reflecting the vehicle speed combined with at least one sub-parameter from among the following: distance in relation to a followed vehicle, number of vehicles within a certain perimeter, navigation data concerning traffic density. For example, the traffic jam driving mode is identified provided that the data from the navigation system detect a traffic jam and provided the vehicle speed is below 90 Km/hr. Thus, this identification of the driving mode may be subject to the verification of another parameter such as vehicle speed.

In order to attribute the supply voltages or define the number and division of activated and deactivated sources, one takes in account a combination of at least the following parameters: vehicle speed and ambient lighting. These parameters are in fact particularly pertinent in order to establish a lighting strategy.

For each function, low and high beam, one defines several lighting modes. Without limitation, each lighting mode features the values of at least two parameters.

The following stages are carried out while the vehicle is in use: receipt of values concerning the parameter; identification from among the plurality of lighting modes of the lighting mode corresponding to these values; determination of a mode of electricity supply to the headlamp in accordance with the lighting mode. For example, the feed voltage or the number of light sources activated is increased in accordance with an increase of vehicle speed and/or a decrease of ambient lighting, and/or an increase of an angle of rotation of the steering wheel.

The values concerning the parameter are taken from one or more of the following sensors: radar, lidar, camera.

The camera is configured to detect at least one of the following:
  number of vehicles close to the vehicle;
  distance between the vehicle and at least one followed vehicle;
  absolute speed of the vehicle equipped with the camera;
  relative speed and/or acceleration in relation to a followed vehicle, following vehicle or passed vehicle;
  color of a marking line on the ground;
  meaning of a signal panel;
  intensity of ambient lighting;
  presence of an urban environment;
  presence of streetlights;
  obstacle; and
  ignition of a stop light of a followed vehicle.

Preferably, the camera is situated at the front of the vehicle.

Advantageously, the same camera may be configured to detect many of the driving modes described above. So alternatively or in addition, the parameter or parameters detected with the camera are combined with other parameters not arising from the camera, such as wheel rotation speed, navigation data etc. This makes it possible, when setting the parameters of the device, to accurately define a large number of driving modes each corresponding to a lighting mode. When using the invention, this also makes it possible to increase the coefficient of confidence associated with the identified driving mode while travelling.

The use of a camera is particularly advantageous since it presents a limited cost. This cost is again reduced whenever the camera provides functions independent of those required within the framework of the present invention.

Advantageously, the supply modes are defined by means of the following stages:
  defining a desired life duration for the headlamp and/or its desired maximum energy consumption for a given duration of use of the headlamp;
  defining a previously determined driving profile characterized by a relative duration of use of the headlamp in each of the lighting modes; and
  calculating a supply mode for each lighting mode so that, with this supply mode, the headlamp can provide satisfactory lighting for this lighting mode while presenting a life duration close to the desired life duration and/or leading to energy consumption close to the desired maximum energy consumption for a use corresponding to the previously determined driving profile.

Thus, by identifying lighting modes which do not require too powerful lighting, one reduces superfluous consumption and/or increases the life duration of the headlamp bulb.

Advantageously, one identifies whether the driver's actual driving profile exceeds a certain threshold of the previously determined driving profile. If such is the case, one then recalculates a new supply mode for each lighting mode. This new supply mode is recalculated so that with this new supply mode, the life duration of the headlamp and/or energy consumption of the headlamp, and thus the $CO^2$ emission, remains significantly constant for this driving profile of the driver.

According to another object of the invention, one arranges a control device of the supply of a vehicle headlamp suitable to supply lighting in high beam and/or low beam function, characterized by the fact that, for at least one function, low or high beam, it is set up to:
  receive values concerning at least one parameter pertinent to the lighting of the vehicle;
  identify, among a plurality of lighting modes, a lighting mode corresponding to these values; and
  determine a supply mode of the headlamp in accordance with the identified lighting mode.

If the headlamp comprises only one bulb, the device according to the invention thus makes it possible to supply this bulb with a voltage which is pertinent to the lighting mode of the current driving situation. This pertinent voltage is sufficiently high to ensure satisfactory lighting and sufficiently limited as not to generate superfluous lighting. The invention thus makes it possible to reduce headlamp consumption and thereby increase the life duration of the bulb, while providing satisfactory lighting conditions.

If the headlamp comprises several light sources such as electro-luminescent diodes, the device according to the invention makes it possible to activate a number of sources pertinent to the lighting mode of the current driving situation. This number of sources is sufficiently high to ensure satisfactory lighting, and sufficiently limited as not to generate superfluous lighting. The invention thus makes it possible to reduce headlamp consumption and thereby reduce $CO_2$ emissions, while providing satisfactory lighting conditions.

As an option, the device according to the invention further comprises at least one of the following characteristics:
  the device comprises at least one among the following means configured to receive at least one parameter pertinent to the lighting of the vehicle:
    means of detecting the number of vehicles close to the vehicle;
    means of detecting the distance between the vehicle and at least one followed vehicle;
    means of detecting the absolute speed of the vehicle;
    means of detecting the relative speed and/or acceleration of the vehicle in relation to a followed vehicle, following vehicle or passed vehicle;
    means of detecting the color of a marking line on the ground;
    means of detecting the meaning of a traffic sign;
    means of detecting and measuring ambient lighting;
    means of detecting the presence of an urban environment;
    means of detecting the presence of streetlights;
    means of detecting an obstacle;
    means of detecting the ignition of brake lights of a followed vehicle;
  the means of detecting can be detectors; and
  the means include a camera set up to receive at least one parameter pertinent to the lighting of the vehicle.

Alternatively, or in addition to the presence of a camera, the device comprises a radar or lidar configured to receive at least one parameter pertinent to the lighting of the vehicle, the parameter being one of the following:
  number of vehicles close to the vehicle;
  detection of a followed vehicle;
  distance between either the vehicle or a followed vehicle;
  relative speed and/or acceleration in relation to a followed vehicle, following vehicle or passed vehicle; and
  presence of an obstacle.

The means include a vehicle location system and a traffic data reception system issued by a remote traffic observation center.

The device comprises a lighting controller set up to receive the values concerning the parameter and generate the feed voltage.

The device is set up to generate a feed voltage in the form of a pulse-width modulation (PWM) signal.

The lighting controller comprises an electronic regulation map intended to be installed in the headlamp.

The device comprises a switch configured to deactivate the controller if the driver engages the high beam function. The driver may actually need powerful lighting whatever the driving situation. In this case, if he manually engages high beam, the feed voltage stated in the invention is not adapted. The headlamp is supplied by the voltage from the battery, itself supplied by the alternator. The switch may also turn off the control unit if the driver operates the brake controls, thus allowing the bulb to be supplied directly by the vehicle's electrics.

The device is able to implement the procedure of controls of the supply according to the present invention.

A profile of use of the vehicle and its headlamps is defined by the manufacturer. In accordance with the life duration or planned consumption, this makes it possible to calculate the maximum levels of the different voltages.

If the vehicle driver does not follow the profile defined by the manufacturer, a lighting control unit modifies the voltage levels in order to guarantee the life duration or planned consumption.

For example, if the control unit detects that the driving mode is 60% in AFS and high beam functions, it will adjust the different voltages of the headlamps to exceed, for example, 1000 hours of life duration for the bulb.

The lighting control unit, often positioned in the body controller, takes into account all the parameters outside and inside the vehicle (navigation, exterior lighting, street lighting, speed, engine running speed) as well as driver preferences (driving mode and "Economy" consumption) to generate the optimal PWM supply voltage of the bulbs so as to improve performances if necessary and/or reduce the $CO_2$ emission of the vehicle to reach only the statutory level of lighting.

The framework of the invention likewise provides a vehicle headlamp including an electricity supply control device according to the present invention. This headlamp is suitable to receive at least one light source.

As an option, the headlamp according to the invention further comprises at least one of the following characteristics:
  several light bulbs;
  at least one bulb dedicated to either the high or low beam function;
  a plurality of light sources in which the device is set up so as to control, in accordance with the identified lighting mode, the activation and deactivation of at least one light source among the plurality light sources, regardless of the activation and deactivation of the other light sources;
  the device and the division of light sources are configured so that, for at least some lighting modes, the light intensity generated by the headlamp varies and the form of the brightness pattern generated by the headlamp remains significantly constant from one lighting mode to the other;
  the light sources are individual electro-luminescent diodes or modules involving several electro-luminescent diodes; and
  the headlamp comprises at least one bulb dedicated to either the high or low beam function.

BRIEF DESCRIPTION OF THE ACCOMPANYING DRAWINGS

Other characteristics, aims and advantages of the present invention will appear upon reading the detailed description below, and with regard to the attached drawings, given by way of example without limitation, on which:

FIG. 3 represents a table illustrating an example of definition of lighting modes with their associated supply voltages;

DETAILED DESCRIPTION OF THE PREFERRED EMBODIMENTS

Figure 1:
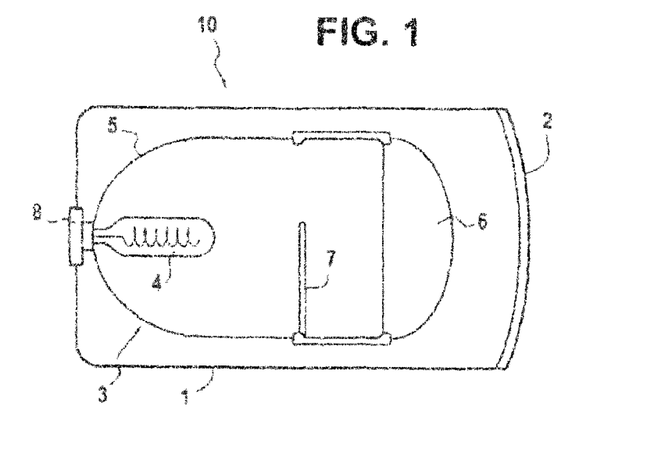
FIG. 1 represents in diagram form a classical motor vehicle headlamp.

FIG. 1 represents an example of a motor vehicle headlamp 10. This headlamp 10 generally comprises a housing 1 closed by a protection window 2. Headlamp 10 comprises a lighting module 3 within the housing 1, for example an elliptical module. Lighting module 3 particularly comprises a light source 4, also known as a bulb, a reflector 5 suitable to reflect the light towards the protection window 2, a lens 6 able to project the light, a movable cover 7 and supply equipment 8 of the bulb 4.

Figure 2:
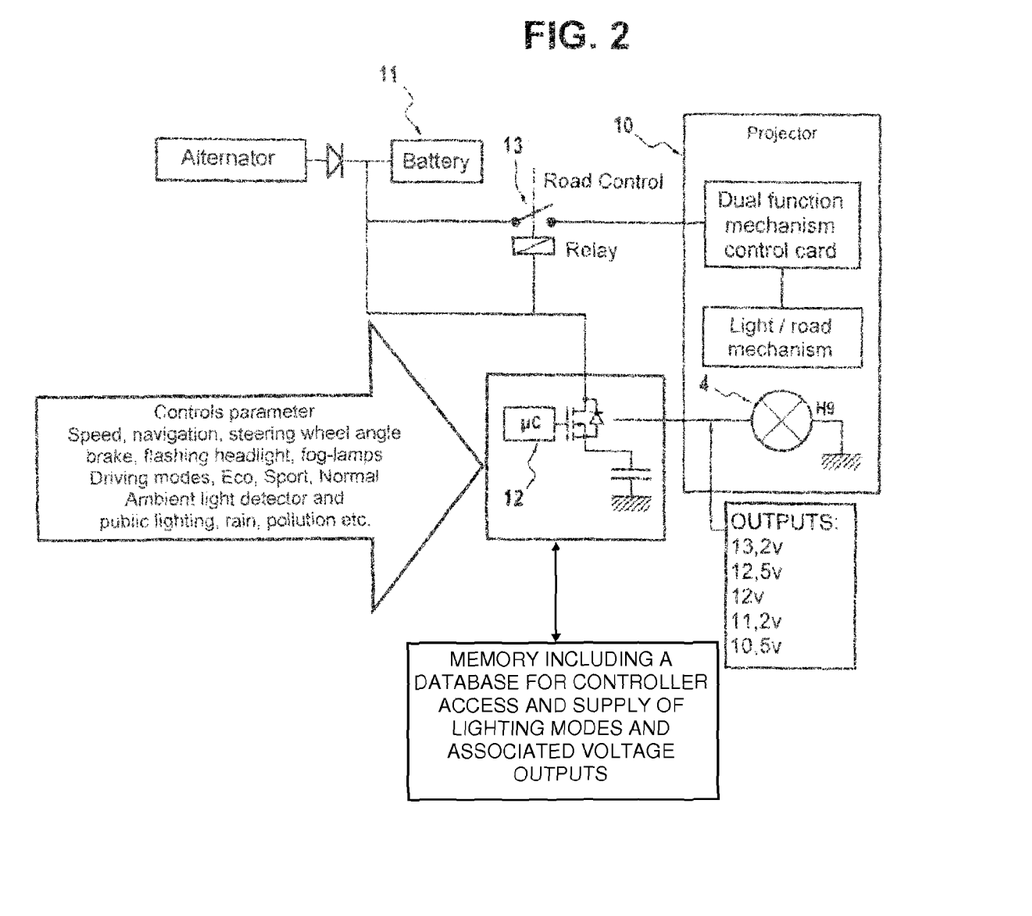
FIG. 2 represents in diagram form a headlamp and an example of a supply device of a headlamp bulb according to the invention.

With reference to FIGS. 2 and 3, one example of commissioning of the invention will now be described.

FIG. 2 shows the major elements of an example of a supply control device associated with headlamp 10 equipped with bulb 4. The device comprises battery 11, configured to supply headlamp 10. Battery 11 likewise supplies lighting controller 12. The function of the lighting controller 12, as will be detailed hereafter, is to supply a feed voltage of bulb 4 which may be adapted to the driving situation so as to generate sufficient lighting while eliminating superfluous lighting. Finally, the controller 12 enables reduced bulb consumption, limit $CO_2$ emissions and prolong the life duration of the bulb 4.

The circuit of FIG. 2 also comprises a direct connection between battery 11 and headlamp 10. A switch 13 is set up to turn off lighting controller 12 when it is closed. When switch 13 is closed, headlamp 10 is directly supplied by battery 11. Switch 13 is linked to a user-operated control. Thus, when the user wishes to use headlamp 10 without adapting the voltage, he activates this control. This may take place when he flashes the headlights. On the example illustrated, the voltage is then at a maximum, in the order of 13.2 Volts (voltage of the vehicle's electrics, generally close to 13.2 V).

One arranges for the switch to be open by default. When switch 13 is open, the voltage supplied by battery 11 passes by lighting controller 12.

As a characteristic of the invention, the control device is equipped with a memory which comprises a data base. This data base contains several lighting modes for at least the low or high beam function. Advantageously, it contains several lighting modes for each of these two functions. It is established here that the lighting modes are separate from the high and low beam functions.

A lighting mode is typically defined by at least one value or a range of values of a parameter concerning the vehicle. To be precise, this parameter is one that is pertinent to the lighting of the vehicle.

It may concern a parameter within the vehicle and be chosen from among the following parameters in particular: vehicle speed, navigation data, running speed of the vehicle engine, rotation speed of a steering wheel of the vehicle, activation of the windscreen wiper and fog lamps, the engaging of a driver-operated control, for example the choice of "Economy" mode and/or applying the brake pedal.

The engaging of a control by the driver may concern at least the choice of a driving mode having a direct relationship with reduced consumption and $CO_2$ emissions—normal, sport or economy driving mode, brake controls and flashing headlights.

It may likewise concern a parameter outside the vehicle. It then reflects the vehicle's environment and may be chosen from among the following parameters in particular: ambient lighting, brightness of street lighting, brightness of daylight.

The exterior parameter may likewise reflect: the number of vehicles within a certain perimeter, distance in relation to a followed vehicle, relative speed and/or acceleration in relation to a followed vehicle, following vehicle or passed vehicle, the color of a marking line on the ground, meaning of a signal panel, presence of an obstacle, arrival at a crossroads or roundabout, the presence of an urban environment, presence of street lighting, presence of a red light, presence of fog, rain, snow or smoke, obstacle detection.

Advantageously, a lighting mode features several parameters. Since these parameters characterize a driving situation, the greater the number of parameters, the more accurately the driving situation is characterized and the more appropriate will be the electricity supply fed to the bulb 4. Thus, traffic density may be determined by navigation data reflecting traffic density or by the vehicle speed combined with at least one sub-parameter from among the following: distance in relation to a followed vehicle, number of vehicles within a certain perimeter, navigation data reflecting traffic density.

The table of FIG. 3 illustrates different lighting modes, the names of which appear on the first line of each column from the second column. The parameters are listed in the first column. The boxes of the table indicate the values of the parameters which characterize the lighting mode of the column considered.

On this example, lighting below a first threshold indicates night, while lighting between thresholds 1 and 2 indicates twilight. The frequency sensor around 100 Hz detects the presence of artificial light. In order to simplify the example, the parameters concerning the speed of the steering wheel, navigation information and information of acceleration and braking were not taken into account.

Preferably, the electricity supply to the headlamp 10 is timed so as not to react to too short changes of detected lighting modes and not to disturb the driver and other vehicles. In the example of FIG. 3, the voltage concerning a detected mode is only applied if the values correspond to this mode for more than five seconds, except for braking controls for which the reaction time is immediate.

Thus, it appears for example that the controller presents a lighting mode in its memory, for the low beam function, entitled "town night low speed mode". This lighting mode features the following parameters: ambient lighting detected below threshold 1, speed below 30 Km/hr and no speed at the steering wheel.

It also appears that the controller presents a lighting mode in its memory, for the high beam function, entitled "high beam reduced speed night mode". This lighting mode features the following parameters: ambient lighting detected below threshold 1, speed between 50 and 70 Km/hr and no speed at the steering wheel.

On the example illustrated, the controller contains different separate lighting modes, each reflecting a specific driving situation. The lighting modes illustrated in FIG. 3 are set out below.

"Town, night, low speed mode": when travelling below 30 Km/hr with ambient lighting below threshold 1, and upon detecting artificial lighting, the voltage applied to the bulb 4 is 10.5 V.

"Town, night, normal speed mode": when travelling between 30 and 50 Km/hr with ambient lighting below threshold 1, and upon detecting artificial lighting, the voltage applied to the bulb 4 is 11.2 V.

"Town, twilight, normal speed mode": when travelling below 50 Km/hr with ambient lighting below threshold 2, and without detecting any artificial lighting, the voltage applied to the bulb 4 is 10.5 V.

"Low beam countryside, twilight, reduced speed mode": when travelling between 50 and 70 Km/hr with ambient lighting below threshold 2, and without detecting any artificial lighting, the voltage applied to the bulb 4 is 11.2 V.

"Low beam countryside, night, reduced speed mode": when travelling between 50 and 70 Km/hr with ambient lighting below threshold 1, and without detecting any artificial lighting, the voltage applied to the bulb 4 is 12.2 V.

"Low beam countryside, night, normal speed mode": when travelling between 70 and 90 Km/hr with ambient lighting below threshold 1, and without detecting any artificial lighting, the voltage applied to the bulb 4 is 12.8 V.

"Low beam countryside, twilight, normal speed mode": when travelling between 70 and 90 Km/hr with ambient lighting below threshold 2, and without detecting any artificial lighting, the voltage applied to the bulb 4 is 12.2 V.

"Low beam, twilight, normal speed mode": when travelling between 70 and 90 Km/hr with ambient lighting below threshold 2, and without detecting any artificial lighting, the voltage applied to the bulb 4 is 12.2 V.

"High beam, night, reduced speed mode": when travelling between 50 and 70 Km/hr with ambient lighting below threshold 1, and without detecting any artificial lighting the voltage applied to the bulb 4 is 12.8 V.

"High beam, night, normal speed mode": when travelling at over 70 Km/hr with ambient lighting below threshold 1, and without detecting any artificial lighting, the voltage applied to the bulb 4 is 13.2 V.

"Low beam fast road mode": when travelling at over 100 Km/hr with ambient lighting below threshold 1, and without detecting any artificial lighting, the voltage applied to the bulb 4 is 12.8 V.

"Low beam motorway mode": when travelling at over 130 Km/hr with ambient lighting below threshold 1, and without detecting any artificial lighting, the voltage applied to the bulb 4 is 13.2 V.

"DBL normal speed mode": when travelling at over 70 Km/hr with ambient lighting below threshold 1, and without detecting any artificial lighting, the voltage applied to the bulb 4 is 13.2 V once the movement of the steering wheel is detected.

"Flashing headlights": The driver flashes the headlights manually, which turns off the lighting control unit. In one variant, this manual control may also transit through the control unit which then generates a PWM signal with a factor of form fit to generate 13.2V at the terminals of the bulb 4.

Likewise characteristically, a voltage is associated with each of these lighting modes. The control device also includes this voltage in its memory. In order to apply the two examples mentioned above, voltages of 10.5 Volts and 12.8 Volts are associated with the modes "town night low speed mode" and "high beam reduced speed night mode" respectively.

The controller is configured to receive values concerning the parameters that characterize the lighting modes. It then identifies the lighting mode corresponding to these values, from among several lighting modes. It then determines the supply mode associated with this lighting mode. If the light source of the headlamp 10 is a bulb 4, each supply mode will preferably correspond to a voltage applied to the bulb 4. Finally, it controls the supply of this voltage to the bulb 4.

Thus, the voltage applied to the headlamp 10 does not depend on the high beam or low beam function, but rather on several lighting modes each corresponding to one driving situation.

Particularly advantageously, the parameter or parameters give the traffic density.

For example, it is arranged for a vehicle equipped with a navigation system to receive information indicating that the vehicle is located in a traffic jam. The device identifies when the vehicle is in traffic jam driving mode and then orders a decrease of power applied to the headlamp 10.

Preferably, this identification of the driving mode may be subject to the verification of another parameter such as vehicle speed. For example, the traffic jam driving mode is identified provided that the data from the navigation system detect a traffic jam and provided that the vehicle speed is below 90 Km/hr.

Thus, the invention makes it possible to reduce the feed voltage or the number of light sources activated when a traffic jam situation is detected. The life duration of the bulb 4 is thus increased and/or the $CO_2$ emission is reduced without significantly impairing safety. In effect, in a traffic jam situation, light intensity may be attenuated since speeds are reduced and the significant concentration of vehicles contributes to lighting the traffic jam zone effectively.

The voltage associated with each of the lighting modes is determined so as to ensure efficient lighting in the driving situation corresponding to the lighting mode, and limit headlamp consumption. First of all, one defines the desired life duration of the bulb 4. This life duration strictly depends on the indications given by the bulb manufacturer. One then defines a previously determined driving profile. This previously determined driving profile features a relative duration of use of the headlamp 10 in each of the driving situations associated with a lighting mode. Advantageously, it corresponds to an average use of the vehicles allocated to be fitted with the device.

For example one may establish that, according to this previously determined driving profile, the headlamp 10 will operate 10% of the time in a driving situation corresponding to a first lighting mode, 20% of the time in a driving situation corresponding to a second lighting mode, 30% of the time in a driving situation corresponding to a third lighting mode and 40% of the time in a driving situation corresponding to a fourth lighting mode.

In practice, the previously determined driving profile and the intended life duration will be defined by the manufacturer in order to adapt the levels of the different voltages.

One then calculates a feed voltage for each lighting mode, so that with this voltage:
- the bulb 4 provides lighting satisfactory for this lighting mode; and
- the bulb 4 presents a life duration close to the desired life duration when the headlamp 10 is used according to the previously determined driving profile.

The feed voltage supplied to the headlamp 10 is lower than the voltage delivered by the battery for all lighting modes which do not require maximum light power. This lowering of the voltage operated by the controller makes it possible to limit bulb consumption. The $CO_2$ emission is thus reduced. Moreover, the life duration of the bulb 4 is increased.

If the vehicle driver does not follow the previously determined driving profile defined by the manufacturer, the lighting control unit automatically modifies the voltages so as to nevertheless achieve the life duration intended with this true driving profile of the driver.

Further characteristics of the device will now be detailed. The device comprises means of supply and the lighting controller 12. The latter may be situated outside the headlamp 10 and may be integrated, if required, within another electronic housing such as the "body controller", to direct the power of the bulbs 4 of the vehicle. It comprises a microcontroller and a voltage converter piloted by the microcontroller.

In this case, the bulb 4 is supplied with a PWM (Pulse Width Modulation) signal, directly by the lighting controller 12 of the vehicle.

The lighting controller 12 comprises an electronic regulation map intended to be installed in the body controller.

It receives the values concerning the parameters originating from several sensors of the vehicle: vehicle speed sensor, ambient lighting sensor, sensor of speed of angle to the steering wheel, navigation system, acceleration sensor, pedal-pushing or control sensor etc. It deduces from this the lighting mode corresponding to the driving situation and controls the application of the voltage associated with this mode.

Particularly advantageously, the vehicle is equipped with a camera acting as a sensor to identify the driving mode and determine the voltage to be applied to the headlamp. To be precise, the camera may be configured to detect:
- the number of vehicles close to the vehicle equipped with the camera. A traffic jam situation may thus be detected. The voltage supplying the headlamp 10 may then be reduced;
- the distance between the vehicle equipped with the camera and at least one followed vehicle. The closer the followed vehicle, the lower the voltage supplying the headlamp 10;
- the relative speed and/or acceleration in relation to a followed vehicle, following vehicle or passed vehicle;
- the absolute speed of the vehicle equipped with the camera;
- the color of a marking line on the ground. If a marking line announces road works, then the voltage supplying the headlamp 10 is temporarily increased so as to reinforce lighting in road works zones, which are often accident black-spots;
- the meaning of a signal panel. If a panel signalling a crossroads or roundabout is detected, then the device controls a lowering of the voltage supplying the headlamp 10. The vehicle equipped with the camera then reaches the crossroads or roundabout without dazzling other vehicles. So as an alternative, or alongside the use of a camera, one may likewise arrange for the device to identify when the vehicle reaches a crossroads or roundabout thanks to a navigation system;

ambient lighting and/or the presence of streetlights and/or presence of an urban environment and/or presence of street lighting. The camera thus makes it possible to dispense with a light sensor;

the presence of a red light;

the presence of visibility-disturbing phenomena such as fog, rain, snow or smoke. Advantageously, the camera likewise determines the density of this phenomenon. Thus, if thick fog is detected, the device intensifies the light generated by the headlamp 10;

obstacle. If an obstacle on the roadway is detected, for example, the invention may increase the voltage of the headlamp 10 so as to temporarily improve the visibility of the obstacle; and ignition of the brake light of a followed vehicle. The ignition of brake lights by the followed car may announce an obstacle or danger located in front of the vehicle equipped with the invention. The headlamp voltage is increased so as to improve visibility and find out why the followed vehicle applied its brakes.

Preferably, the camera is situated in front of the vehicle. According to the nature of the detection to be carried out, the camera may be very basic or be equipped with color and/or obstacle recognition devices, signal panels, etc.

The use of a camera is particularly advantageous since it implies a limited cost. This cost is further reduced when the camera provides functions apart from those required within the framework of the present invention.

Advantageously, the same camera may be configured to detect several of the driving modes described above. So alternatively or in addition, the parameter or parameters detected with the camera are combined with other parameters such as wheel rotation speed, navigation data etc. This makes it possible, at the time when the system was created, to accurately define a large number of driving modes. At the time of use of the invention, this also makes it possible to increase the coefficient of confidence associated with the driving mode identified while travelling.

Figure 4:
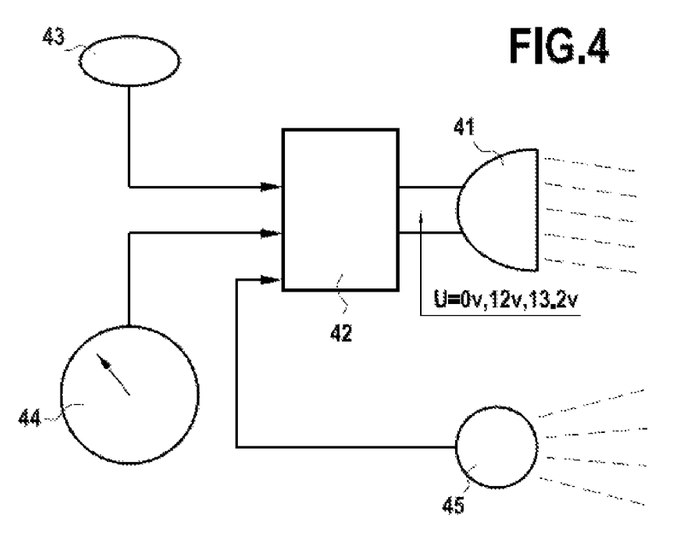
FIGS. 4 and 5 each represent in diagram form a headlamp and another example of a supply device to a headlamp bulb according to the invention in which several sensors are used in order to determine the supply mode of the headlamp.

In the example illustrated in FIG. 4, the voltage of headlamp 41 is controlled by a piloting unit 42 which collects the data from several sensors 43, 44, 45. On this example, these data originate from a lighting sensor 43, speed sensor 44 and radar 45 measuring the presence of a followed vehicle close to the equipped vehicle, or measures the distance between the equipped vehicle and a followed vehicle.

The piloting unit 42 combines the data from these sensors in order to determine the driving mode in which the vehicle is found so as to determine the feed voltage to be applied to headlamp 41.

For example:

if lighting sensor 43 detects urban lighting and speed sensor 44 identifies that the vehicle speed is not nil, then piloting unit 42 applies a voltage of 12 Volts to headlamp 41;

if lighting sensor 43 detects urban lighting and speed sensor 44 identifies that the vehicle speed is nil, then piloting unit 42 applies a voltage of 0 Volts to headlamp 41;

if lighting sensor 43 does not detect any exterior lighting and speed sensor 44 identifies that the vehicle speed is nil, then piloting unit 42 applies a voltage of 12 Volts to headlamp 41; and if radar 45 detects a followed vehicle close to the equipped vehicle, then piloting unit 42 applies a voltage of 12 Volts to headlamp 41.

Advantageously, speed sensor 44 measures the rotation speed of the wheels.

Advantageously, radar 45 is a speed regulating radar. This radar 45 serves not only to direct the lighting. The implementation of the invention on a vehicle therefore does not require additional radar, which makes it possible to limit the costs.

Figure 5:
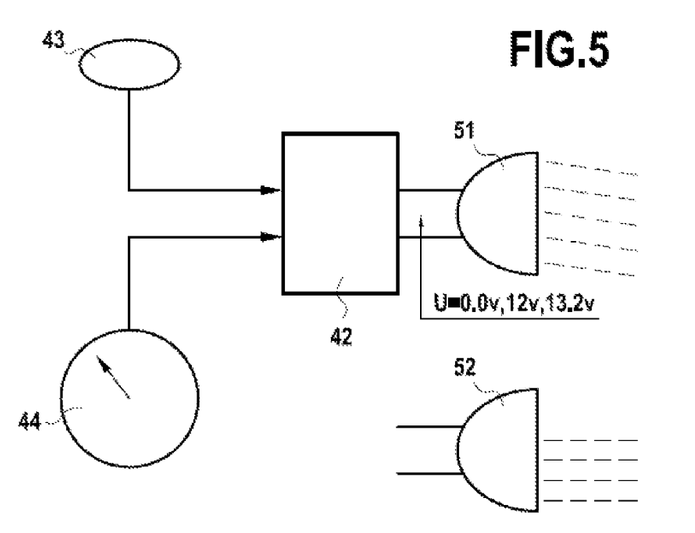

In the example illustrated in FIG. 5, piloting unit 42 controls the voltage of a first headlamp 51 by providing a low beam function also known as sidelights. In addition to gathering data from lighting sensor 43 and speed sensor 44, piloting unit 42 collects data from a second headlamp 52 which provides a high beam function also known as headlights.

Piloting unit 42 is configured so as to identify whether the sidelights are activated at the same time as the headlights 51 and 52. If this is the case, piloting unit 42 lowers the voltage applied to the sidelights at 12 Volts. Thus, the light close to the vehicle is reduced, which is hardly detrimental to driving safety and comfort since the headlights 51 and 52 are activated. Energy consumption is reduced, and the life duration of the light source of the sidelights is prolonged.

This example may of course be combined with the previous example by using radar 45 in order to determine the driving mode.

Preferably, the device is set up so as to detect if a high density of vehicles within the camera's range is situated to the left or right of the vehicle.

If this high density of vehicles is situated to the right, then the device deduces that the equipped vehicle is in a traffic jam situation. The device then identifies a lighting mode corresponding to driving in a traffic jam. The feed voltage of the headlamp is consequently reduced.

If this high density of vehicles is situated to the left, then the device deduces that these vehicles are travelling in the opposite direction to that of the equipped vehicle. It is therefore not in a traffic jam situation and the identified lighting mode does not correspond to driving in a traffic jam.

Preferably, other parameters are analyzed in order to determine whether or not the equipped vehicle has entered a traffic jam. These parameters may for example seek to identify, on the basis of movements or relative speeds, if the vehicles are travelling in the same direction as the equipped vehicle.

This detection of a traffic jam is valid for countries that practice driving on the right. In order to configure a vehicle equipped with the present invention in countries that practice driving on the left, a control is also provided in order to invert the detection of traffic density: if high vehicle density is situated to the left, then the device deduces that the equipped vehicle is in a traffic jam situation. The device then identifies a lighting mode corresponding to driving in a traffic jam. The feed voltage of the headlamp is consequently reduced.

In a particularly advantageous mode of realization, the headlamp 10 comprises several light sources. Each light source 4 may be an incandescent bulb or, preferably, an electro-luminescent diode or a module involving several electro-luminescent diodes or several bulbs.

The device according to the invention is configured in order to control, in accordance with the identified lighting mode, the activation and deactivation of at least one light source from among the several light sources, regardless of the activation and deactivation of the other light sources.

Thus, according to the driving situation, one adapts the lighting generated by the headlamp by modulating the division of activated and deactivated light sources. Energy consumption and $CO_2$ emissions are thus reduced.

In a particular mode of realization, at least one supply mode of the headlamp 10 defines the activation or deactivation of each of the sources regardless of the other light sources. In order to limit the complexity of the device, it is arranged for several light sources to belong to the same module and be activated and deactivated together. This is particularly advantageous when the headlamp 10 comprises a large number of electro-luminescent diodes. Several electro-luminescent diodes are then regrouped to form the same module, and the device controls the simultaneous activation or deactivation of all the electro-luminescent diodes of the module.

Advantageously, the device and the division of the light sources are configured so that, for at least several lighting modes, the light intensity generated by the headlamp 10 varies and the form of the lighting pattern generated by the headlamp 10 remains significantly constant from one lighting mode to the other.

Thus, one arranges that in one supply mode, the deactivated and activated sources are divided so as not to show any variation of the pattern. The deactivation of certain light sources thus does not give rise to any dark or barely lit zones. The driver's perception of the generated pattern consequently remains constant in any driving mode. On the other hand, the beam intensity varies from one driving mode to the other. One may therefore significantly reduce the power consumed by the headlamp without seriously disturbing the driver. Advantageously, the perception of the pattern also remains constant for other vehicle drivers or pedestrians.

This mode of realization with adaptation of the lighting by modulating the number and/or division of light sources also applies to light sources consisting of bulbs and electro-luminescent diodes or modules consisting of electro-luminescent diodes.

Figure 6:
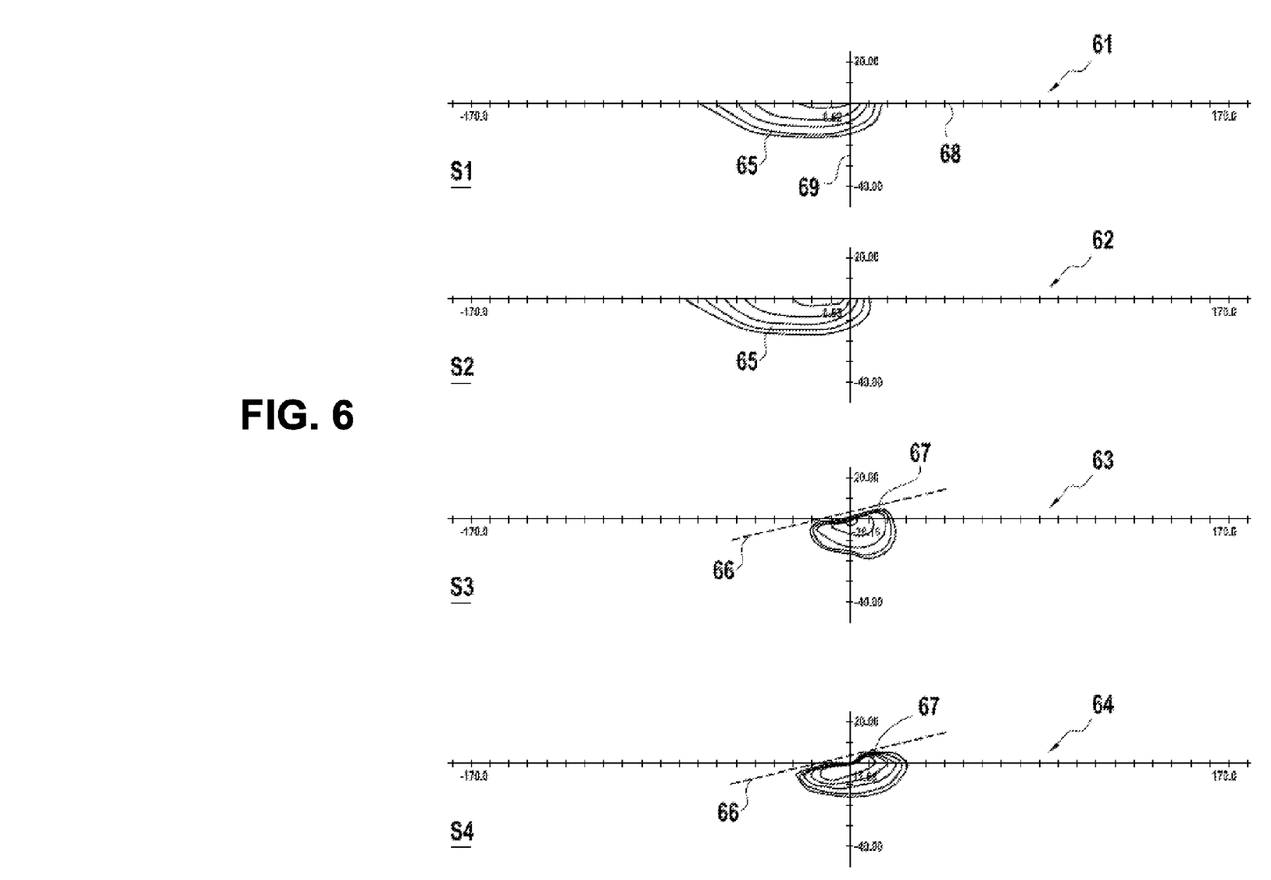
FIG. 6 represents four elementary beams arising respectively from one light source.
Figure 7:
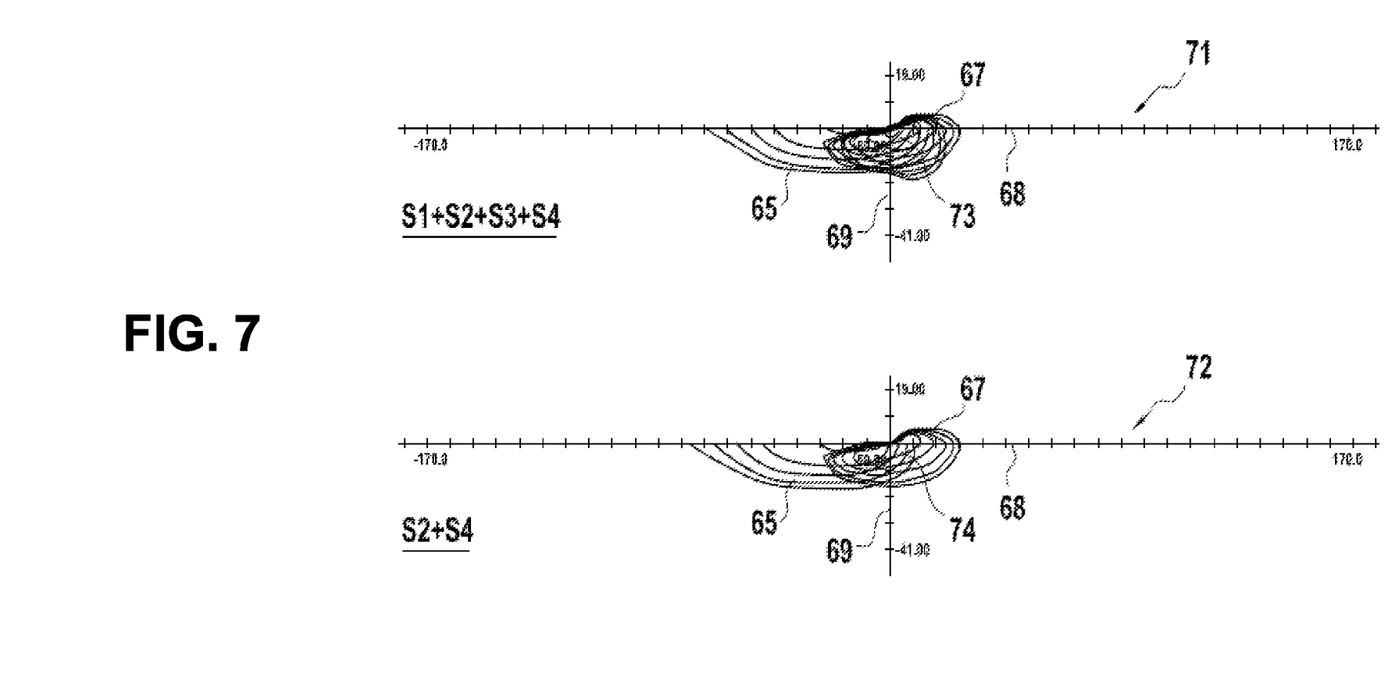
FIG. 7 represents two complex beams from four light sources and two light sources respectively.

FIGS. 6 and 7 illustrate this adaptation of lighting by modulating the activation or deactivation of light sources.

FIG. 6 represents patterns 61, 62, 63, 64 of four elementary beams each generated by a light source 81, 82, 83, 84. Each light source 81, 82, 83, 84 is a bulb or electro-luminescent diode or module formed by one or more electro-luminescent diodes or a module formed by one or more bulbs.

Axes 68 and 69 represent the horizon line and vertical line respectively. The center defined by these axes 68, 69 is situated at the front of the vehicle equipped with the present invention. The lines within the patterns are lines of iso-intensity of light and thus reflect zones of the same light intensity.

Source S1 generates an elementary beam, with pattern reference 61, and the light intensity of which is almost nil above the horizon line. This type of beam is habitually referred to as a beam with horizontal cut-off. It avoids dazzling oncoming drivers. This beam makes it possible to effectively light the center of the road.

As appears clearly on FIG. 6, source S2 generates an elementary beam, pattern 62 of which is significantly identical to pattern 61 of the beam generated by source S1.

Source S3 generates an elementary beam, pattern 63 of which presents an oblique cut-off according to axis 67. This beam is concentrated around axis 68 formed by the intersection of the horizon line and vertical line 69. It avoids dazzling oncoming drivers on the left and lights up a zone 67 situated above the horizon line to the right.

As appears clearly on FIG. 6, source S4 generates an elementary beam, pattern 64 of which is significantly identical to pattern 63 of the beam generated by source S3.

FIG. 7 represents pattern 71 of a complex beam obtained by activating sources S1, S2, S3 and S4. Pattern 71 of this complex beam is formed by overlapping patterns 61, 62, 63, 64 of each of the elementary beams. It thus accumulates the characteristics of each of the patterns 61, 62, 63, 64 of these elementary beams. Particularly, one finds zone 65 lighting up under the horizon line to the left and generated by the elementary beams of sources S1 and S2. One also finds zone 67 lighting up above the horizon line to the right, generated by the elementary beams of sources S3 and S4.

FIG. 7 represents a complex beam generated by sources S2 and S4 only. Pattern 72 of this complex beam corresponds to the overlapping of patterns 62, 64 only.

Pattern 72 is very significantly identical to pattern 71. Particularly, one finds zone 67 lighting up under the horizon line to the left and zone 65 lighting up above the horizon line to the right.

Consequently, by deactivating sources S1 and S3, one does not significantly modify the generated pattern. In particular, there are no zones which become unlit due to the deactivation of sources 1 and 3. The driver of the equipped vehicle is therefore not disturbed. Other drivers and pedestrians are likewise not disturbed. The beam of pattern 72 requires only half as many light sources as are required to obtain the beam of pattern 71. Energy consumption and $CO^2$ emissions are thus considerably reduced. This reduction of consumption is accompanied by a lowering of light intensity. This lowering manifests as a less strong density of lines of iso-intensity of light on pattern 72 than on pattern 71.

This lowering of light intensity is not however damaging in numerous driving situations. As explained in detail previously, the device that constitutes the object of the present invention identifies these driving situations and consequently adapts the supply mode of the headlamp in order to conserve appropriate lighting while reducing energy consumption.

In one variant of realization, one shall note that accordance with the identified lighting mode, one may at the same time adapt the voltage and/or intensity applied to the source and at the same time modulate the division and/or number of activated sources.

An example without limitation will now be detailed to facilitate the understanding of the invention.

To show how to increase the life duration of a bulb in accordance with the voltage of this bulb, it should be recalled that the life duration of a bulb varies with the power less 13 of the voltage at these terminals.

We consider a bi-halogen headlamp, itself equipped with bulb H9 and used 10% of the time on fast roads (speed of over 100 km/hr), 10% of the time in bend mode, and 10% of the time in high beam mode (long range). These three driving situations correspond to lighting modes which represent 30% of the life duration of the bulb. These driving situations require intense lighting. The bulb will therefore be supplied at the maximum voltage for these lighting modes. We consider a voltage supplied by the battery of 13.2 Volts. The life duration of such a bulb supplied with this voltage is about 250 hours. The life duration consumed by all of these three driving situations is thus 30% * 250 hours=75 hours.

By taking into account B3 of 250-hour bulb H9, there thus remain 250 hours–75 hours=175 hours during which one may supply bulb H9 at voltages below the battery output voltage, so as to reduce consumption while achieving less powerful lighting performances, but which are nevertheless acceptable for other driving situations. One thus significantly increases life duration.

To achieve life duration of about 900 hours, that is, equivalent to that of a bulb of type H7LL (long-life bulb H7), one reduces the supply voltages in accordance with the speed fields, for example:
 speed>30 km/hr (65% of the remaining time not included in the 30% of wear at 13.2V) performances equivalent to those of an H7LL: V=11.8V (voltage for which the life duration of the bulbs is multiplied by 4); and
 speed<30 km/hr or speed=0 km/hr (35% of the remaining time not included in the 30% of wear at 13.2V): performances reduced but statutory: V=10.5V, (voltage for which the life duration of the bulbs is multiplied by 19).

One thus achieves, for this driving profile, a total life duration of the bulb of:

$$Ltime = 75\ h_{13.2\,Volts} + 175 \times 0.65 \times 4 + 175 \times 0.35 \times 19 = 1693\ hours.$$

In this case, on the basis of a history of the applied voltages and durations of lighting modes, the control unit may evaluate this excessive life duration in advance, and for example increase the voltage of the headlamps from 10.5V to 11V to reach 612 hours of life duration in the town, that is, a total of 1142 hours of estimated life duration for the bulb.

Thus, the control unit, in accordance with this history, adjusts the voltage so that, for example, if the life duration is higher than the acceptable life duration threshold, one may increase the voltage applied. If it is lower, one may decrease the voltage to prolong life duration.

The invention thus makes it possible to multiply the life duration of the bulb by 6.68 while offering lighting conditions suited to driving situations.

Nevertheless, one may choose to increase the voltage of the headlamps from 10.5V to 11V to reach 612 hours of life duration in town that is, 1522 hours in all. Lighting at low speed will thus be higher than statutory lighting, and the life duration of the bulbs will nevertheless be multiplied by 6.1 in relation to use in permanent maximum power.

If, as explained previously, the driver does not follow the previously determined driving profile defined by the manufacturer, the lighting control unit automatically modifies the voltages so as to nevertheless achieve the life duration planned with this real driving profile.

For example, if the control unit detects that the relative duration of use at full power is 60% (high beam and high speed function and/or driving on a bend for example), then the controller adjusts the voltages of each of the driving modes so as to exceed 1000 hours of life duration with the driver's true profile.

This example is easily transposable and makes it possible to highlight the advantages of the invention: to maintain an acceptable life duration (typically in the order of 1000 hours), while offering high performances in the required conditions (advanced lighting function, function of lighting orientation on a bend generally referred to by its acronym DBL—Dynamic Bending Light), "normal" performances in standard driving conditions and statutory performances in conditions which require nothing else (low beam in town, parking light etc.).

One highway regulation defines a dotted grid on a vertical screen situated at a given distance from the headlamp. For each of these points, the regulation will define the acceptable light intensities. For example, according to European regulations, for headlamps homologated in "low beam", the regulation allows 12 lux. However, it is standard practice to have lighting of 25 lux at 25 m at point 75R. This makes it possible to lower the voltage at the terminals of the bulbs to a voltage below 12V. In the case of lighting of point 75R directed at 15 lux obtained by under-voltage of the bulb, and provided the other points defined in the standard remain above the statutory limits, the application of the formula expressing the brightness performance of the bulb in power −3.25 of the voltage, makes it possible to envisage an applied voltage of ~10.25V:

$$V = 12 \times e^{\frac{1}{3.25} \times Ln\frac{15}{25}}$$

$$V = 10.25V$$

In travelling conditions at reduced speed (town, traffic jam, traffic lights etc.) one may thus envisage to reduce the power by $(10.37/14)^{*2}$ that is 35 W per bulb, that is, 70 W per vehicle. This power reduction leads considerably recovered $CO_2$ emissions (about 3.5 gr $CO_2$/km in this case).

So, it is admitted that the cycle of recombination of halogen in a bulb is not affected provided the voltage is not below 10V. This application is thus made perfectly possible in practice.

Provided a vehicle travels more than two thirds of the time in town, this lowering of power makes it possible to very significantly increase its life duration. If, for the use of a bi-Halogen bulb of type H9, the increased life duration thus obtained is used to increase lighting performances on bends (a function generally designated by its acronym DBL, Dynamic Bending Light), in high beam mode, indeed in motorway mode in order to increase performance by 30%. In this configuration, detection by the headlamp may take place with the aid of motors of static or dynamic corrections. To this effect, the motors may be motors of direct current or in sequential stages.

The invention is not limited to the modes of realization described, but extends to any mode of realization in accordance with its spirit.

For example, the manufacturer may decide to reduce the voltage only at the terminals of the bulbs for the purposes of reducing $CO_2$ emissions in the town.

Moreover, according to one mode of realization, it is arranged to equip the headlamp with the same bulb to ensure the high and low beam functions. According to another mode of realization, the headlamp comprises several bulbs. According to one variant, one or more these bulbs provide low and high beam functions at the same time. According to another variant, at least one of these bulbs is dedicated to either high or low beam functions.

While the procedure and device herein described constitute preferred embodiments of this invention, it is to be understood that the invention is not limited to this precise procedure and device, and that changes may be made therein without departing from the scope of the invention which is defined in the appended claims.

What is claimed is:

1. A procedure of controls of the supply of a vehicle headlamp suitable to supply lighting in high beam function and/or low beam function, wherein said procedure comprises the following stages for at least one among the low high beam function and the high beam function:
   determining at least one driving parameter pertinent to the lighting of the vehicle;
   defining a plurality of lighting modes characterized by the value of at least one parameter;
   attributing a supply mode of the headlamp to each lighting mode:
   storing in memory the supply mode associated with each of the lighting modes;
   wherein the supply modes are defined by carrying out the following stages:
   defining a desired life duration for the headlamp and/or desired maximum energy consumption of the headlamp for a given duration of use of the headlamp;

defining a previously determined driving profile characterizing a relative duration of use of the headlamp in each of the lighting modes; and calculating a supply mode for each lighting mode, so that with this supply mode the headlamp provides lighting satisfactory for this lighting mode while presenting a life duration close to the desired life duration and/or while inducing an energy consumption close to the maximum energy consumption desired for a use corresponding to the previously determined driving profile.

2. The procedure according to claim 1, in which each supply mode of the headlamp corresponds to a given voltage applied to the headlamp and/or corresponds to a given intensity applied to the headlamp.

3. The procedure according to claim 1, in which the headlamp comprises several light sources and in which each supply mode of the headlamp defines the activation or deactivation of at least one light source regardless of other light sources.

4. The procedure according to claim 3, in which the lighting supplied by the headlamp generates a lighting pattern and a light intensity, in which the supply modes are defined so that the pattern is significantly identical for at least several supply modes and so that for these several supply modes the light intensity varies from one supply mode to the other.

5. The procedure according to claim 4, in which the light sources are incandescent bulbs, electro-luminescent diodes or modules comprising a plurality of electro-luminescent diodes or a plurality of bulbs.

6. The procedure according to claim 1, in which this at least one parameter, comprises at least one parameter within the vehicle chosen from among the following parameters: vehicle speed, navigation data, running speed of the vehicle engine, rotation speed of a steering wheel of the vehicle, activation of the windscreen wiper and fog lamps, an acceleration value, a speed or angle of activation of a brake pedal or accelerator, the engaging of a control by the driver.

7. The procedure according to claim 1, in which this at least one parameter comprises a parameter which is indicative of the state outside the vehicle chosen from among the following parameters: ambient lighting, brightness of street lighting, brightness of daylight, degrees of pollution, number of vehicles within a certain perimeter, distance in relation to a followed vehicle, relative speed and/or acceleration in relation to a followed vehicle, following vehicle or passed vehicle, the color of a marking line on the ground, meaning of a signal panel, presence of an obstacle, arrival at a crossroads or roundabout, presence of an urban environment, presence of street lighting, presence of a red light, presence of fog, rain, snow or smoke, obstacle detection.

8. The procedure according to claim 1, in which this at least one parameter, comprising a parameter which is indicative of traffic density, traffic density being determined by navigation data reflecting traffic density or by navigation data reflecting the vehicle speed combined with at least one sub-parameter from among: the distance in relation to a followed vehicle, number of vehicles within a certain perimeter, navigation data reflecting traffic density.

9. The procedure according to claim 1, in which the following stages are carried out while the vehicle is in use:
receipt of values concerning the said parameter;
identification of the lighting mode corresponding to these values, from among the plurality of lighting modes; and
determination of a supply mode of the headlamp in accordance with the said lighting mode.

10. A control device of the supply of a vehicle headlamp suitable to supply lighting in high beam function and in low beam function, wherein for at least one among the low and high beam functions, it is set up to:
receive values concerning at least one parameter pertinent to the lighting of the vehicle;
identify, among a plurality of lighting modes, a lighting mode corresponding to these values; and
determine a supply mode of the headlamp in accordance with the identified lighting mode;
wherein said control device is adapted to:
determine at least one driving parameter pertinent to the lighting of the vehicle;
define a plurality of lighting modes characterized by the value of at least one parameter:
attribute a supply mode of the headlamp to each lighting mode;
storing in memory the supply mode associated with each of the lighting modes;
wherein the supply modes are defined by carring out the following stages;
define a desired life duration for the headlamp and/or desired maximum energy consumption of the headlamp for a given duration of use of the headlamp;
define a previously determined driving profile characterizing a relative duration of use of the headlamp in each of the lighting modes; and
calculate a supply mode for each lighting mode, so that with this supply mode the headlamp provides lighting satisfactory for this lighting mode while presenting a life duration close to the desired life duration and/or while inducing an energy consumption close to the maximum energy consumption desired for a use corresponding to the previously determined driving profile.

11. The control device according to claim 10, wherein said control device comprises at least one of the following means configured to receive at least one parameter pertinent to the lighting of the vehicle:
means of detecting the number of vehicles close to the said vehicle;
means of detecting the distance between the said vehicle and at least one followed vehicle;
means of detecting the absolute speed of the said vehicle;
means of detecting the relative speed and/or acceleration of the said vehicle in relation to a followed vehicle, following vehicle or passed vehicle;
means of detecting the color of a marking line on the ground;
means of detecting the meaning of a traffic sign;
means of detecting and measuring ambient lighting;
means of detecting the presence of an urban environment;
means of detecting the presence of streetlights;
means of detecting an obstacle;
means of detecting the ignition of brake lights of a followed vehicle; and
a radar or lidar configured to receive one of the following parameters: number of vehicles close to the said vehicle, detection of a followed vehicle, distance between the said vehicle and a followed vehicle, relative speed and/or acceleration in relation to followed vehicle, following vehicle or passed vehicle, presence of an obstacle.

12. The control device according to claim 10, wherein said control device is suitable to commission a procedure having the following steps:
determining at least one driving parameter pertinent to the lighting of the vehicle;
defining several lighting modes characterized by the value of this at least one parameter;

attributing a supply mode of the headlamp to each lighting mode; and storing in memory the supply mode associated with each of the lighting modes.

13. A vehicle headlamp that comprises a device according to claim 10.

14. A vehicle headlamp according to claim 13 comprising a plurality of light sources and in which the device is set up so as to control, in accordance with the identified lighting mode, the activation and deactivation of at least one light source taken from among the plurality of light sources, regardless of the activation and deactivation of other light sources.

15. A control device for controlling an electrical supply of a vehicle light source suitable to supply lighting in high beam function and/or low beam function, wherein said control device comprises:
- at least one sensor for determining at least one driving parameter pertinent to the lighting of the vehicle;
- a database stored in memory and defining a plurality of lighting modes characterized by the value of this at least one parameter;
- said database defining supply modes of the vehicle light source to each of said plurality of lighting modes; and
- a memory for storing said supply modes associated with each of said plurality of lighting modes;
- where said control device is adapted to:
  - determine at least one driving parameter pertinent to the lighting of the vehicle;
  - define a plurality of lighting modes characterized by the value of at least one parameter;
  - attribute a supply mode of the headlamp to each lighting mode; and
- storing in memory the supply mode associated with each of the lighting modes; and
  - wherein the supply modes are defined by carrying out the following stages;
  - define a desired life duration for the headlamp and/or desired maximum energy consumption of the headlamp for a given duration of use of the headlamp;
  - define a previously determined driving profile characterizing a relative duration of use of the headlamp in each of the lighting modes; and
  - calculate a supply mode for each lighting mode, so that with this supply mode the headlamp provides lighting satisfactory for this lighting mode while presenting a life duration close to the desired life duration and/or while inducing an energy consumption close to the maximum energy consumption desired or the a use corresponding to the previously determined driving profile.

16. The control device according to claim 15, wherein each supply mode of the vehicle light source corresponds to a given voltage applied to the vehicle light source and/or corresponds to a given intensity applied to the vehicle light source.

17. The control device according to claim 15, in which the vehicle light source comprises several light sources and in which each supply mode of the vehicle light source defines the activation or deactivation of at least one light source regardless of other light sources.

18. The control device according to claim 17, in which the lighting supplied by the vehicle light source generates a lighting pattern and a light intensity, in which the supply modes are defined so that the pattern is significantly identical for at least several supply modes and so that for these several supply modes the light intensity varies from one supply mode to the other.

19. The control device according to claim 18, in which the vehicle light sources are incandescent bulbs, electro-luminescent diodes or modules comprising a plurality of electro-luminescent diodes or a plurality of bulbs.

* * * * *